United States Patent
Sekiguchi

(10) Patent No.: US 8,947,689 B2
(45) Date of Patent: Feb. 3, 2015

(54) INFORMATION PROCESSING APPARATUS HAVING RELIABLE DISPLAY SCREEN CONTROL WITHIN PRINTER DRIVER, STORAGE MEDIUM, AND CONTROL METHOD THEREOF

(71) Applicant: Canon Kabushiki Kaisha, Tokyo (JP)

(72) Inventor: Shiho Sekiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/903,083

(22) Filed: May 28, 2013

(65) Prior Publication Data

US 2013/0321839 A1      Dec. 5, 2013

(30) Foreign Application Priority Data

May 30, 2012   (JP) .................................. 2012-122912

(51) Int. Cl.
*G06F 3/12*      (2006.01)
*G06F 9/445*     (2006.01)

(52) U.S. Cl.
CPC ................ *G06F 3/1225* (2013.01); *G06F 8/61* (2013.01)
USPC ....... 358/1.13; 358/1.15; 358/1.16; 358/1.18; 717/174; 717/175; 717/176

(58) Field of Classification Search
None
See application file for complete search history.

(56) References Cited

U.S. PATENT DOCUMENTS

| | | | |
|---|---|---|---|
| 8,472,057 B2* | 6/2013 | Nagashima .................. | 358/1.15 |
| 2008/0055640 A1* | 3/2008 | Takahashi et al. ........... | 358/1.15 |
| 2009/0213416 A1* | 8/2009 | Ishigure ...................... | 358/1.15 |
| 2009/0251727 A1* | 10/2009 | Yokomizo et al. ........... | 358/1.15 |

FOREIGN PATENT DOCUMENTS

| | | |
|---|---|---|
| JP | 2001-306736 A | 11/2001 |
| JP | 2009-289201 A | 12/2009 |

* cited by examiner

*Primary Examiner* — Miya J Cato
(74) *Attorney, Agent, or Firm* — Canon U.S.A, Inc. IP Division

(57) ABSTRACT

An information processing apparatus is configured to display a consent screen when a printer driver is to be installed without using an installer even if approval has once been obtained from a user.

6 Claims, 7 Drawing Sheets

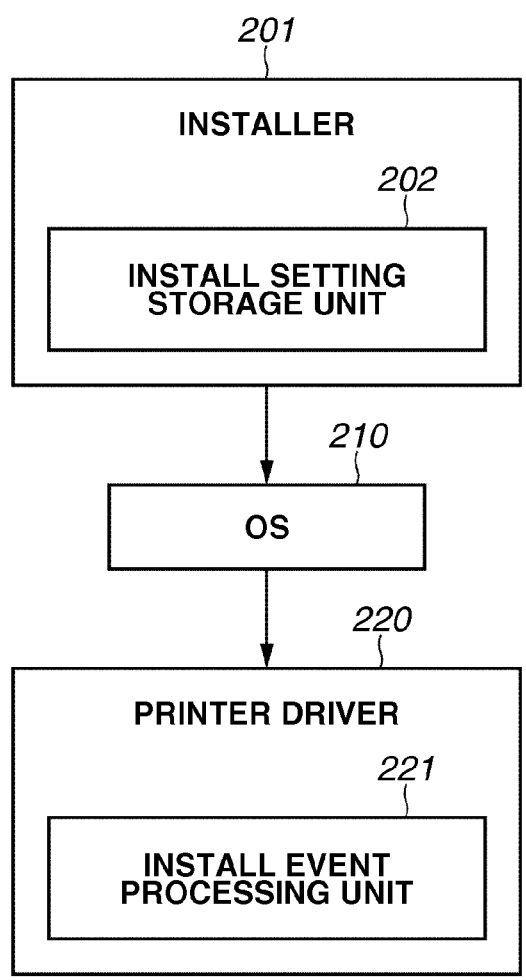

INFORMATION TRANSMISSION CONFIRMATION SCREEN _ ×

THE FOLLOWING INFORMATION MAY BE TRANSMITTED TO THE SERVER IN ORDER TO PROVIDE YOU WITH INFORMATION THAT SUITES YOUR USAGE ENVIRONMENT.

- LANGUAGE SETTING INFORMATION
- AREA WHERE YOU RESIDE IN

CLICK "I APPROVE" IF YOU APPROVE OF THE ABOVE.
CLICK "I DO NOT APPROVE" IF YOU DO NOT APPROVE OF THE ABOVE.

[ I APPROVE ]    [ I DO NOT APPROVE ]

INFORMATION TRANSMISSION CONFIRMATION SCREEN _ ×

THE FOLLOWING INFORMATION MAY BE TRANSMITTED TO THE SERVER IN ORDER TO PROVIDE YOU WITH INFORMATION THAT SUITES YOUR USAGE ENVIRONMENT.

- LANGUAGE SETTING INFORMATION
- AREA WHERE YOU RESIDE IN
- TYPE OF OS

CLICK "I APPROVE" IF YOU APPROVE OF THE ABOVE.
CLICK "I DO NOT APPROVE" IF YOU DO NOT APPROVE OF THE ABOVE.

[ I APPROVE ]    [ I DO NOT APPROVE ]

302                303

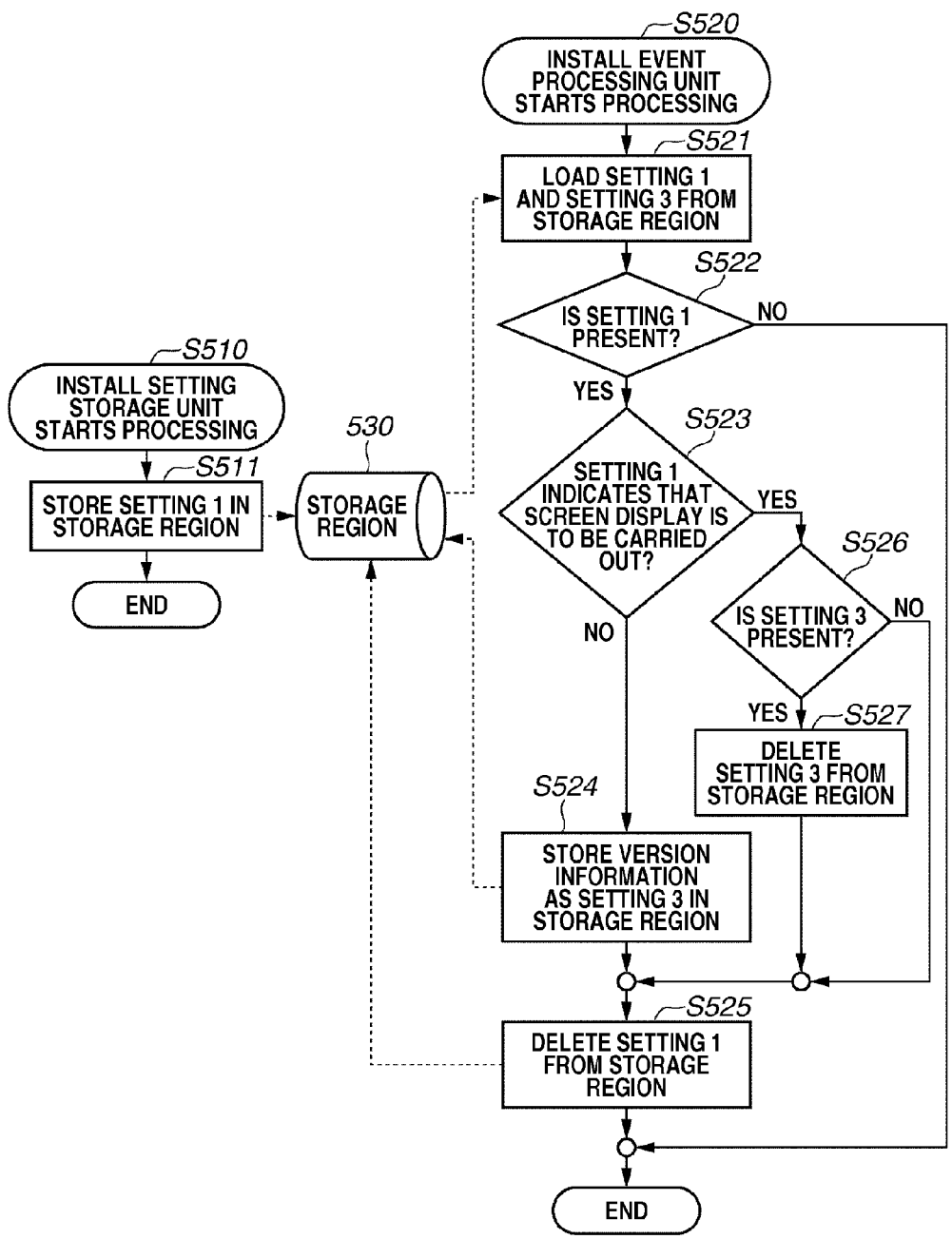

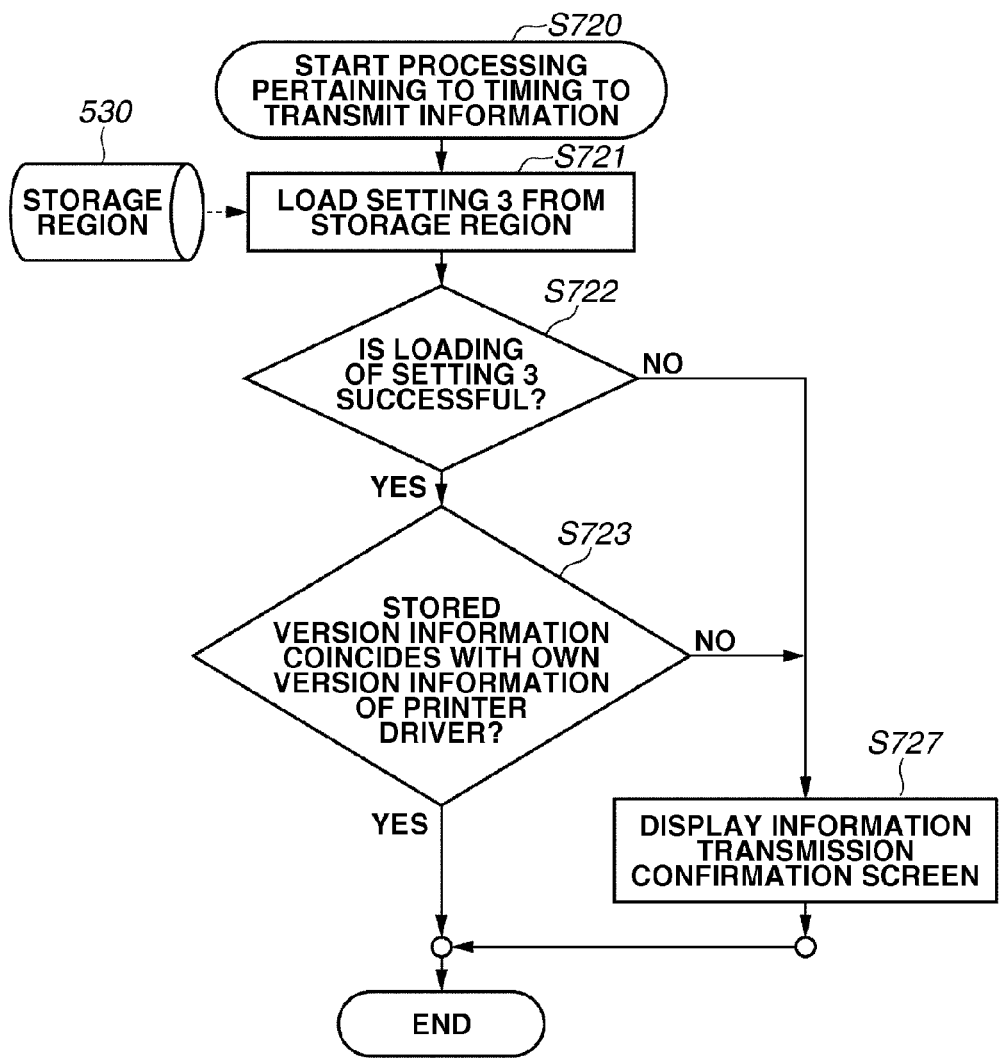

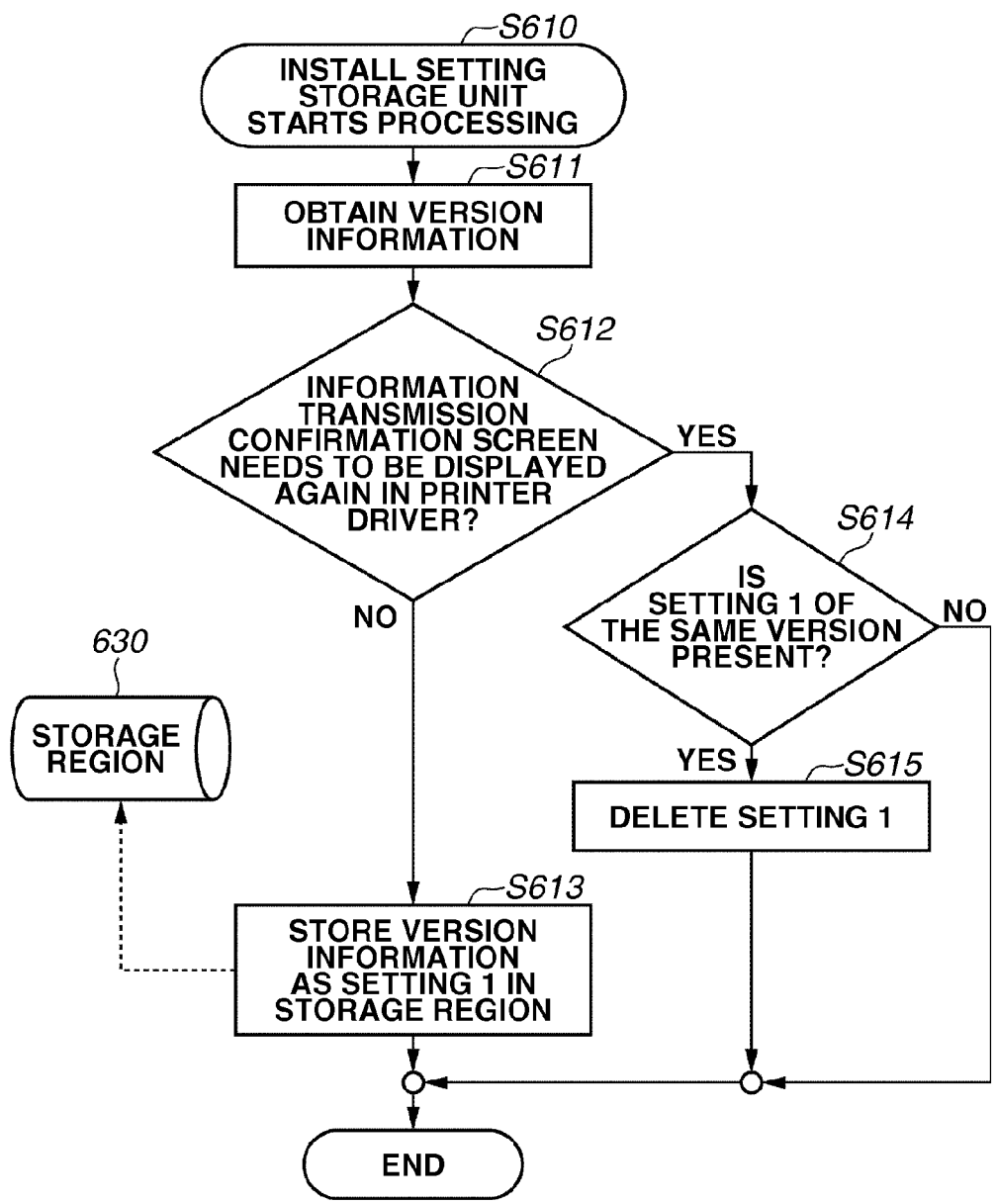

INFORMATION PROCESSING APPARATUS HAVING RELIABLE DISPLAY SCREEN CONTROL WITHIN PRINTER DRIVER, STORAGE MEDIUM, AND CONTROL METHOD THEREOF

BACKGROUND OF THE INVENTION

1. Field of the Invention

The present invention relates to a printing control apparatus capable of controlling a screen display within a printer driver using information set while the printer driver is installed.

2. Description of the Related Art

There exists a technique to control a screen display of an application by using information set by an installer while installing the application. For example, Japanese Patent Application Laid-Open No. 2001-306736 discusses a technique in which information to the effect that a user has accepted a license agreement for an application is stored and the information on the accepted license agreement is used in later processing of the application to control a screen display. Further, Japanese Patent Application Laid-Open No. 2009-289201 discusses a technique in which in an integrated installer that sequentially calls up a plurality of standalone installers, each of the plurality of standalone installers controls a screen display using information set by the integrated installer.

The aforementioned techniques can be realized through a configuration in which an installer stores information obtained during installation into a file or a storage device and an application refers to the information stored in the file or the storage device.

However, in a relationship between a printer driver and an installer, a problem arises when the printer driver refers to the information stored by the installer. This is because, unlike a typical application that presupposes installation using an installer, the printer driver can be installed without using an installer.

Specifically, the following issues may arise. When, for example, a printer driver is installed using an installer, information stored by the installer remains in an information processing apparatus. When the printer driver is installed after that to overwrite existing installation without using the installer, normally, if the installer is not used, information to be stored by the installer is not stored in the information processing apparatus. However, since the installer has been used during previous installation, the information stored previously by the installer is retained. This results in a state where the printer driver installed without using the installer can use the information stored by the installer during previous installation. Accordingly, a problem arises in that the printer driver installed without using the installer mistakenly uses the information that is retained in the information processing apparatus. In particular, if information indicating that a user's approval has been obtained (e.g., accepted license agreement information) is mistakenly used, the accepted license agreement information may be applied to a scope where the user's approval is not obtained.

SUMMARY OF THE INVENTION

The present invention is directed to enable a more reliable screen display control within a printer driver by using information during installation through a means that allows the printer driver to appropriately use the information stored by the installer during installation.

According to an aspect of the present invention, an information processing apparatus stores information indicating that a user has approved of processing by a first printer driver and includes a control unit configured to display a consent screen when, after the information has been stored, a second printer driver is installed to overwrite the first printer driver without using an installer for the second printer driver, the consent screen being configured to accept an instruction from a user as to whether the user approves of processing by the second printer driver or the user does not approve of the processing by the second printer driver.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a configuration of an installer and a printer driver.

FIGS. 3A and 3B illustrate examples of an information transmission confirmation screen.

FIG. 5A is a flowchart illustrating processing of an install setting storage unit and an install event processing unit according to a second exemplary embodiment, and FIG. 5B is a flowchart illustrating processing pertaining to the timing of information transmission.

FIG. 6 is a flowchart illustrating processing of an install setting storage unit.

DESCRIPTION OF THE EMBODIMENTS

Various exemplary embodiments, features, and aspects of the invention will be described in detail below with reference to the drawings.

Exemplary embodiments described hereinafter are not intended to limit the scope of the present invention as claimed in the appended claims. Furthermore, combinations of features described in the exemplary embodiments are not all essential in implementing the present invention.

Figure 1:
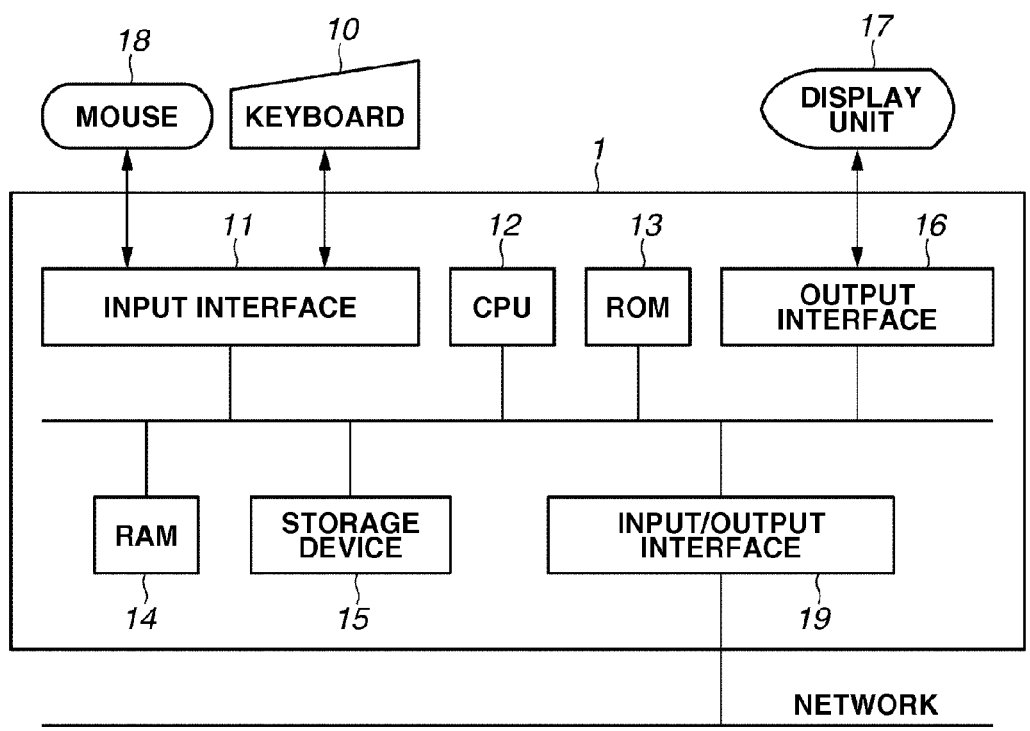
FIG. 1 is a block diagram illustrating a configuration of an information processing apparatus.

A configuration of an information processing apparatus of an exemplary embodiment will be described with reference to a block diagram of FIG. 1. An information processing apparatus 1 includes an input interface 11, a central processing unit (CPU) 12, a read-only memory (ROM) 13, a random-access memory (RAM) 14, a storage device 15, an output interface 16, a display unit 17, a keyboard 10, a mouse 18, and an input/output interface 19. The input/output interface 19 is connected to a network. The ROM 13 holds an initialization program. The storage device 15 stores application programs, an operating system (OS), a printer driver, and various pieces of data. The RAM 14 serves as a work memory for various programs stored in the storage device 15. In the description to follow, Windows (registered trademark) from Microsoft Corporation, for example, is used as an OS.

As the CPU 12 executes processing based on a program stored in the storage device 15, a software configuration of the information processing apparatus 1 as illustrated in FIG. 2 and processing in each step in the flowcharts are realized.

Figure 4:
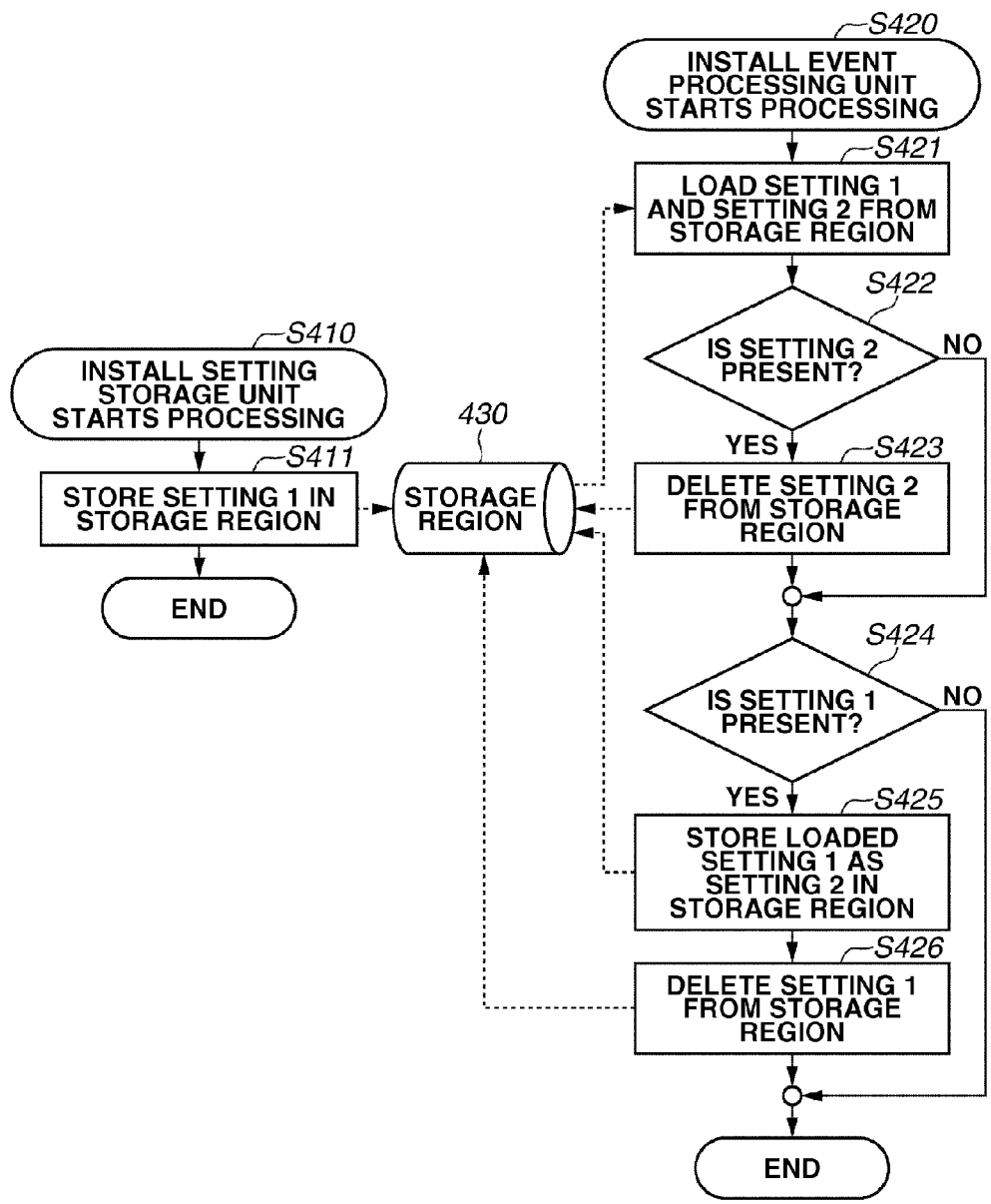
FIG. 4 is a flowchart illustrating processing of an install setting storage unit and an install event processing unit according to a first exemplary embodiment.

With reference to FIGS. 2 to 4, a first exemplary embodiment of the present invention will now be described in detail.

FIG. 2 is an example of a block diagram conceptually illustrating a configuration for installing a printer driver according to the first exemplary embodiment. Internal processing of an installer 201 and a printer driver 220 will be described for the following three cases.

Case 1: The printer driver 220 is installed using an installer 201.

Case 2: The printer driver 220 is installed without using the installer 201.

Case 3: Case 2 is performed in an environment where the printer driver 220 has been installed first through Case 1. Here, the printer driver 220 to be installed with second installation (i.e., a printer driver to be installed with AddPrinter) in Case 3 is installed by overwriting the printer driver 220 installed in the first installation. Further, the printer driver 220 to be installed in the second installation and the printer driver 220 installed in the first installation are used in the same model.

Overwrite installation refers to newly installing software to overwrite existing installation to update or fix the software that has been installed previously. As the previously installed software is overwritten, naturally, the previously installed software cannot be started, and instead, the newly installed software can be started. Such overwrite installation is distinguished from clean installation in which previously installed software is once uninstalled and then the software is newly installed.

That is, in the overwrite installation, settings 1 to 3 described later will not be deleted during installation. On the other hand, in the clean installation, the settings 1 to 3 are deleted during installation, and thus a consent screen is always displayed after clean installation.

Here, the printer driver 220 installed with the first installation in Case 3 is assumed to have been installed normally.

Further, in the first exemplary embodiment, processing to perform control to determine whether or not to display an information transmission confirmation screen will be described as an example of a screen display control of the printer driver 220. An information transmission confirmation screen (consent screen) such as an information transmission confirmation screen 301 as illustrated in FIG. 3A is a screen to obtain consent of a user to transmit to a server, information on the state of an application and on an information processing apparatus used by the user. In a typical application, the information transmission confirmation screen 301 is often displayed during installation. However, in the printer driver 220, which can be installed without using the installer 201, the information transmission confirmation screen 301 needs to be displayed when the information is to be transmitted to the server.

In this specification, the term "setting" refers to a user pressing a button 302 to indicate approval or pressing a button 303 to indicate non-approval in an information transmission confirmation screen. This setting, in other words, is consent information.

A case where an exemplary embodiment of the present invention is applied in Case 1 in which the printer driver 220 is installed using the installer 201 will be described with reference to FIG. 4.

FIG. 4 is a flowchart illustrating processing in an install setting storage unit 202 of the installer 201 and an install event processing unit 221 of the printer driver 220.

In step S410, the install setting storage unit 202 starts processing to store information set by the installer 201 during installation into a storage region 430 within the storage device 15. In step S411, the information set during installation is stored in the storage region 430 as a setting 1. In the first exemplary embodiment, if a user presses the "I approve" button 302, the install setting storage unit 202 stores in the storage region 430 information to the effect that the user's approval to the information transmission has been obtained as the setting 1. Meanwhile, if the user presses the "I do not approve" button 303, the install setting storage unit 202 stores in the storage region 430 information to the effect that the user's approval to the information transmission has not been obtained as the setting 1.

If the approval has been obtained, the printer driver 220 transmits the information, and if the approval has not been obtained, the printer driver 220 does not transmit the information. That is, if the approval has been obtained, the printer driver 220 carries out part of the processing of which the user has approved, and if the approval has not been obtained, the printer driver 220 does not carry out part of the processing of which the user has not approved. The printer driver 220 does not carry out part of the processing of which the user has not approved, for example, if the printer driver 220 has not obtained the user's approval to a web connection, the printer driver 220 does not establish a web connection.

Although the installer 201 is configured to display an information transmission confirmation screen in this specification, consent may be obtained from a user when an installer is to be downloaded from a website. In such a configuration, the installer stores the setting 1 without displaying an information transmission confirmation screen.

After the install setting storage unit 202 stores the information set during installation in the storage region 430, the installer 201 issues an install event to an OS 210. The OS 210 then calls up the install event processing unit 221 within the printer driver 220 associated with the issued install event to process the install event. Specifically, the association is automatically established through a function of the OS 210 when the install event processing unit 221 defined by a UI module within the printer driver 220 is exported.

In step S420, the install event processing unit 221 starts processing, and then in step S421, the install event processing unit 221 loads the setting 1 and a setting 2 from the storage region 430. In step S422, the install event processing unit 221 determines whether or not the install event processing unit 221 has successfully loaded the setting 2 from the storage region 430. Then, if the setting 2 is present in the storage region 430 (i.e., if the loading has been successful), the install event processing unit 221 deletes the setting 2 in step S423. Meanwhile, if the setting 2 is not present in the storage region 430, the install event processing unit 221 stands by. Then, in step S424, the install event processing unit 221 determines whether or not the install event processing unit 221 has successfully loaded the setting 1 from the storage region 430 in the aforementioned step S421. If the setting 1 is present in the storage region 430, the install event processing unit 221 stores the setting 1 as the setting 2 in the storage region 430 in step S425. That is, information as to whether the user has approved of the information transmission is in the end stored as the setting 2 in the storage region 430.

Note that the setting 2 may be stored in a different location from the setting 1 or may be stored in the same storage location as the setting 1 by overwriting the setting 1 with a distinct ID indicating whether or not the user has approved. In the latter case, processing to delete the setting 1 by the install event processing unit 221, which will be described later in detail, is carried out at the time when the setting 2 is stored to overwrite the setting 1, and thus such processing is omitted. Furthermore, in the latter case, the setting 2 may include an ID identifying itself as the setting 2 and information indicating whether or not the user has approved.

After the install event processing unit 221 stores the setting 2, the install event processing unit 221 deletes the setting 1 from the storage region 430 in step 426, and then the install event processing unit 221 terminates the processing. If the setting 1 is not present in the storage region 430 in step S424, the install event processing unit 221 terminates the processing at that point. When the install event processing unit 221 completes the processing, the printer driver 220 is registered in the OS 210 and becomes available for use.

The printer driver 220 refers to the setting 2 stored in the storage region 430, which allows the printer driver 220 to carry out a screen display control. In the first exemplary embodiment, the printer driver 220 refers to the setting 2 in the storage region 430 at the timing of carrying out the information transmission. If the consent to the information transmission has been obtained, the printer driver 220 skips displaying the information transmission confirmation screen 301, and if the consent has not been obtained, the printer driver 220 displays the information transmission confirmation screen 301.

Next, Case 2 in which the printer driver 220 is installed without using the installer 201 will be described.

When Windows (registered trademark) is used, AddPrinter allows a user to install the printer driver 220 without using the installer 201. In this case, the OS 210 itself issues an install event to start the installation processing. In this case, since the install setting storage unit 202 of the installer 201 has not carried out any processing, the setting 1 is not stored in the storage region 430. The OS 210 then calls up the install event processing unit 221 within the printer driver 220 associated with the install, to process the install event that has been issued by the OS 210. The processing of the install event processing unit 221 is the same as that in Case 1. Thus, since the setting 1 is not stored in the storage region 430 as mentioned earlier, the install event processing unit 221 determines that the setting 2 is not present (NO in step S422), then determines that the setting 1 is not present (NO in step S424), and thus terminates the processing. Through this, after the install event processing unit 221 has completed the processing, neither the setting 1 nor the setting 2 is stored in the storage region 430.

If the setting 2 is stored in the storage region 430, as in Case 1, the printer driver 220 refers to the setting 2 stored in the storage region 430, which allows the printer driver 220 to carry out the screen display control. However, although the printer driver 220 refers to the setting 2 in the storage region 430 at the timing of carrying out the information transmission, the setting 2 is not present in the storage region 430 as mentioned earlier, and thus the printer driver 220 in turn displays the information transmission confirmation screen 301.

Lastly, Case 3 in which Case 2 is performed in an environment where the printer driver 220 has been installed first through Case 1 will be described.

At the point when the printer driver 220 is installed in the first installation using the installer 201, only the setting 2 is present in the storage region 430. If the user attempts to install the printer driver 220 without using the installer 201 in the aforementioned state, the install event processing unit 221 first determines that the setting 2 is present in step S422 and deletes the setting 2 from the storage region 430 in step S423. Then, in step S424, the install event processing unit 221 determines that the setting 1 is not present and terminates the processing. Thus, in the end, neither the setting 1 nor the setting 2 is present in the storage region 430.

As in Case 1 and Case 2, the printer driver 220 refers to the setting 2 stored in the storage region 430 to carry out the screen display control. In the first exemplary embodiment, although the printer driver 220 refers to the setting 2 in the storage region 430 at the timing of carrying out the information transmission, the setting 2 is not present therein, and thus the printer driver 220 in turn displays the information transmission confirmation screen 301.

With the above-described configuration, not only in Case 1 and Case 2, but even in Case 3, the screen display within the printer driver 220 can be controlled without mistakenly using the setting 1 and the setting 2 in the storage region 430. That is, in any of Cases 1 to 3, when the installer 201 does not display the information transmission confirmation screen 301, the printer driver 220 reliably displays the information transmission confirmation screen 301. Further, when the installer 201 displays the information transmission confirmation screen 301, the printer driver 220 can be controlled not to display the information transmission confirmation screen 301 again. This control can reduce such annoyance to the user that the same screen is displayed multiple times.

Although the first exemplary embodiment has been described with respect to the display control of the information transmission confirmation screen 301 illustrated as an example, the above-described configuration can be applied similarly to control other screen displays.

Hereinafter, with reference to FIGS. 5A and 5B, a second exemplary embodiment of the present invention will be described.

The first exemplary embodiment has a problem in that, when the printer driver 220 is installed to overwrite previous installation, setting information stored during previous installation cannot be inherited. To describe more specifically an example of the user's consent to the information transmission, when the printer driver 220 is to be installed to overwrite the same version thereof, the printer driver 220 may inherit settings pertaining to the user's consent to the information transmission. However, when the printer driver 220 is to be installed to overwrite a different version thereof, the printer driver 220 should not inherit settings pertaining to the user's consent to the information transmission. This is because content as to which the printer driver 220 should obtain consent from the user may differ for each version.

FIG. 3B illustrates a case where content as to which the consent is to be obtained from the user differs from that illustrated in FIG. 3A. FIG. 3A, for example, is an older version of the information transmission confirmation screen and displays a screen for obtaining approval from the user to transmit to a server two pieces of information including language setting information and information on the residing area. Meanwhile, FIG. 3B is a newer version of the information transmission confirmation screen than that illustrated in FIG. 3A and is a screen for obtaining approval from the user to transmit to the server, in addition to the two pieces of information described in FIG. 3A, information on the type of the OS.

The problem at the beginning of the description of the second exemplary embodiment is presented to state that the user's approval obtained through FIG. 3A cannot serve as user's approval in FIG. 3B as well. To prevent such a case, in the first exemplary embodiment, the information transmission confirmation screen has always been displayed for the printer driver 220 installed with AddPrinter. On the other hand, in the second exemplary embodiment, a determination is made as to whether the version of the printer driver 220 to be installed with AddPrinter differs from the version of the printer driver 220 installed with the installer 201. Through this, a determination, for example, is made as to whether or not to display the information transmission confirmation screen.

That is, in the second exemplary embodiment, an exemplary configuration in which, when the printer driver 220 is installed to overwrite the same version thereof, the previous setting information can be inherited will be described. Three cases that are the same as those in the first exemplary embodiment will be described in detail.

Further, similarly in the second exemplary embodiment, processing to perform control to determine as to whether or not to display an information transmission confirmation screen as represented in FIGS. 3A and 3B will be described as an example of the screen display control of the printer driver 220.

Case 1 in which the printer driver 220 is installed using the installer 201 will be described with reference to FIG. 5A.

FIG. 5A is a flowchart illustrating processing of the install setting storage unit 202 of the installer 201 and the install event processing unit 221 of the printer driver 220. In step S510, the install setting storage unit 202 starts processing to store information set by the installer 201 during installation into a storage region 530 within the storage device 15. In step S511, the install setting storage unit 202 stores the information set during installation into the storage region 530 as the setting 1.

If the user presses the "I approve" button 302, the install setting storage unit 202 stores in the storage region 530 information to the effect that the user's approval to the information transmission has been obtained as the setting 1. Meanwhile, if the user presses the "I do not approve" button 303, the install setting storage unit 202 stores in the storage region 530 information to the effect that the user's approval to the information transmission has not been obtained as the setting 1. This is the same as in the first exemplary embodiment.

After the install setting storage unit 202 stores the information set during installation into the storage region 530, the installer 201 issues an install event to the OS 210. The OS 201 calls up the install event processing unit 221 within the printer driver 220 associated with the issued install event to process the install event. Specifically, the association is automatically established through a function of the OS 210 when the install event processing unit 221 defined by the UI module within the printer driver 220 is exported.

In step S520, the install event processing unit 221 starts processing, and then in step S521, the install event processing unit 221 loads from the storage region 530 the setting 1 and a setting 3. In step S522, the install event processing unit 221 determines whether or not the setting 1 is present in the storage region 530. The determination is made based on whether or not the install event processing unit 221 has successfully loaded the setting 1, as in the first exemplary embodiment. This is the same in the description to follow. If the setting 1 is present in the storage region 530, in step S523, the install event processing unit 221 determines whether or not the setting 1 is information indicating that the screen display is to be carried out. The expression "information indicating that the screen display is to be carried out" means that information to the effect that the user's approval to the information transmission has not been obtained is stored as the setting 1. If the setting 1 does not indicate that the screen display is to be carried out, in step S524, the install event processing unit 221 stores version information of the printer driver 220 into the storage region 530 as the setting 3. That is, the install event processing unit 221 in the end stores information on whether or not the user has approved of the information transmission in the storage region 530 as the setting 3, and that value indicates the version information of the printer driver 220.

Note that the setting 3 may be stored in a different location from the setting 1 or may be stored in the same storage location as the setting 1 to overwrite the setting 1. In the latter case, processing to delete the setting 1 by the install event processing unit 221, which will be described later, is carried out at the time when the setting 3 is stored to overwrite the setting 1, and thus such processing is omitted.

Thereafter, in step S525, the install event processing unit 221 deletes the setting 1 from the storage region 530 and terminates the processing. If the setting 1 indicates that the screen display is to be carried out in step S523, the install event processing unit 221 determines whether or not the setting 3 is present in the storage region 530 in step S526. If the setting 3 is present therein, in step S527, the install event processing unit 221 deletes the setting 3 from the storage region 530. Thereafter, in step S525, the install event processing unit 221 deletes the setting 1 from the storage region 530 and terminates the processing. If the install event processing unit 221 determines that the setting 1 is not present in step S522, the install event processing unit 221 terminates the processing at that point. When the install event processing unit 221 completes the processing, the printer driver 220 is registered in the OS 210 and becomes available for use.

The printer driver 220 refers to the setting 3 stored in the storage region 530, which allows the printer driver 220 to carry out the screen display control. Processing of the printer driver 220 at the timing when the printer driver 220 transmits information will be described specifically with reference to FIG. 5B. In step S721, the printer driver 220 refers to the setting 3 in the storage region 530 at the timing to transmit information. In step S722, the printer driver 220 determines whether or not the printer driver 220 has successfully loaded the setting 3. Since the setting 3 is stored as mentioned earlier, the printer driver 220 determines that the loading has been successful and proceeds to step S723. In step S723, the printer driver 220 determines whether or not the stored version information coincides with the own version information. If the stored version information coincides with the own version information, the printer driver 220 skips displaying the information transmission confirmation screen 301 and terminates the processing. On the other hand, if the stored version information does not coincide with the own version information, the printer driver 220 displays the information transmission confirmation screen 301 in step S727.

Next, Case 2 in which the printer driver 220 is installed without using the installer 201 will be described.

If a means such as AddPrinter described in the first exemplary embodiment is used, the OS 210 itself issues an install event, which causes the installation processing of the printer driver 220 to be started. In this case, since the install setting storage unit 202 of the installer 201 does not carry out any processing, the setting 1 is not stored in the storage region 530. Then, the OS 201 calls up the install event processing unit 221 within the printer driver 220 associated with the install event to process the install event which the OS 210 itself has issued. The processing of the install event processing unit 221 is the same as that in Case 1. Accordingly, since the setting 1 is not stored in the storage region 530 as mentioned earlier, in step S522, the install event processing unit 221 determines that the setting 1 is not present (NO in step S522) and terminates the processing. Through this processing, after the install event processing unit 221 has completed the processing, neither the setting 1 nor the setting 3 is stored in the storage region 530.

As in Case 1, the printer driver 220 refers to the setting 3 stored in the storage region 530, which allows the printer driver 220 to carry out the screen display control. Here, similarly to the above, processing of the printer driver 220 at the timing when the printer driver 220 transmits information will be described with reference to FIG. 5B. Although the printer driver 220 refers to the setting 3 in the storage region 530 in step S721, the setting 3 is not present in the storage region 530 as mentioned earlier. Thus, the printer driver 220 fails to load the setting 3 in step S722 and proceeds to step S727. In step S727, the printer driver 220 displays the information transmission confirmation screen 301.

Lastly, Case 3 in which Case 2 is performed in an environment where the printer driver 220 has been installed first through Case 1 will be described.

At the point when the printer driver 220 is installed in the first installation using the installer 201, if the user's approval is obtained, only the setting 3 is present in the storage region 530. When the printer driver 220 is to be installed without using the installer 201 in the aforementioned state, the install event processing unit 221 determines that the setting 1 is not present in step S522 and terminates the processing at that point. Accordingly, in the end, the setting 3 stored during the first installation remains in the storage region 530.

As in Case 1 and Case 2, the printer driver 220 refers to the setting 3 stored in the storage region 530 to carry out the screen display control. Processing of the printer driver 220 when the printer driver 220 transmits information in the screen display control will be described with reference to FIG. 5B. In step S721, the printer driver 220 refers to the setting 3 in the storage region 530. Then, in step S722, the printer driver 220 determines whether or not the printer driver 220 has successfully loaded the setting 3. If the loading has been successful, the printer driver 220 proceeds to step S723, and if the loading has failed, the printer driver 220 proceeds to step S727. In Case 3, the printer driver 220 proceeds to step S723. In step S723, the printer driver 220 determines whether or not the stored version information coincides with the own version information of the printer driver 220. If they coincide, the printer driver 220 skips displaying the information transmission confirmation screen 301. On the other hand, if the stored version information does not coincide with the own version information, in step S727, the printer driver 220 displays the information transmission confirmation screen 301. This enables a control to allow the information transmission confirmation screen 301 to be displayed only when the printer driver 220 is to be installed to overwrite a different version thereof.

With the above-described configuration, in addition to the effects of the first exemplary embodiment, when the printer driver 220 is installed to overwrite the same version thereof, the screen display within the printer driver 220 can be controlled with the previous setting information being inherited. Further, typically, version management among different applications tends to be troublesome, but with the above-described configuration, since only the printer driver 220 carries out the version management, advantageously, the troublesome version management does not need to be carried out.

In the second exemplary embodiment, the installer 201 stores the version information in the setting 3, and the printer driver 220 switches between displaying and not displaying the information transmission confirmation screen 301 using the stored version information. However, in view of the stated problem, a reason why the printer driver 220 that is installed without using the installer 201 has to display the information transmission confirmation screen 301 is that content of the information to be transmitted by the printer driver 220 may differ depending on the versions. Accordingly, processing in FIGS. 5A and 5B may be carried out with the version information replaced by the content as to which the user's consent is obtained.

Hereinafter, with reference to FIG. 6, a third exemplary embodiment of the present invention will be described.

In the third exemplary embodiment, as in the second exemplary embodiment, an exemplary configuration in which, when the printer driver 220 is installed to overwrite the same version thereof, the previous setting information can be inherited will be described. In the second exemplary embodiment, the installer 201, for example, does not carry out version management, and the printer driver 202 obtains the version information and stores the version information again in the storage device 15. In the third exemplary embodiment, the installer 201 obtains the version information and stores the version information in the storage device 15, which can yield similar effects to the second exemplary embodiment. Three cases that are the same as in the first and second exemplary embodiments will be described in detail.

Further, similarly in the third exemplary embodiment, processing to perform control as to whether or not to display an information transmission confirmation screen as represented in FIGS. 3A and 3B will be described as an example of the screen display control of the printer driver 220.

Case 1 in which the printer driver 220 is installed using the installer 201 will be described with reference to FIG. 6.

FIG. 6 is a flowchart illustrating processing of the install setting storage unit 202 of the installer 201. In step S610, the install setting storage unit 202 starts processing to store information set by the installer 201 during installation into a storage region 630 within the storage device 15. In step S611, the install setting storage unit 202 first obtains version information of the printer driver 220. In Windows (registered trademark), the version information of the printer driver 220 can, for example, be obtained by using a setting file (INF file) on which information required for installing the printer driver 220 is recorded. To be more specific, a driver version is recorded on the INF file, and the installer 201 reads the version information from the INF file. Then, in step S612, the install setting storage unit 202 determines whether or not the information transmission confirmation screen 301 displayed by the installer 201 needs to be displayed again in the printer driver 220. In the third exemplary embodiment, the install setting storage unit 202 determines that the information transmission confirmation screen 301 does not need to be displayed again in the printer driver 220 if the user presses the "I approve" button 302. Then, the install setting storage unit 202 stores the version information obtained in step S611 in the storage region 630 as the setting 1 in step S613 and terminates the processing. If the install setting storage unit 202 determines in step S612 that the information transmission confirmation screen 301 needs to be displayed again in the printer driver 220, that is, if the user presses the "I do not approve" button 303, the install setting storage unit 202 proceeds to step S614. In step S614, the install setting storage unit 202 determines whether or not the setting 1 indicating that the version information is the same as the version information obtained in step S611 is present in the storage region 630. If the setting 1 indicating that the version information is the same as the version information obtained in step S611 is present, the install setting storage unit 202 deletes the setting 1 from the storage region 630 in step S615 and terminates the processing.

Step S615 is provided to prevent information indicating that the screen display is not necessary, from remaining when the install setting storage unit 202 determines that the screen needs to be displayed again in the printer driver 220. To be more specific, step S615 is provided to prevent the installer 201 from disadvantageously installing the same version of the printer driver 220 twice.

That is, if the printer driver 220 is installed twice, there may be a case where the user approves on the information transmission confirmation screen 301 during the first installation but does not approve on the information transmission confirmation screen 301 during the second installation. In such a case, if the setting 1 remains being stored in step S615, the printer driver 220 may mistakenly determine that the user's consent has been obtained even when the user has not approved during the second installation. Such a disadvantage can be prevented by providing step S615.

After the install setting storage unit 202 terminates the processing, the installer 201 issues an install event to the OS 210. The OS 210 then calls up the install event processing unit 221 within the printer driver 220 associated with the issued install event to process the install event. Specifically, the association is automatically established through a function of the OS 210 when the install event processing unit 221 defined by the UI module within the printer driver 220 is exported. When the install event processing unit 221 completes the processing, the printer driver 220 is registered in the OS 210 and becomes available for use.

The printer driver 220 refers to the setting 1 stored in the storage region 630, which allows the printer driver 220 to carry out the screen display control. In the third exemplary embodiment, the printer driver 220 refers to the setting 1 in the storage region 630 at the timing to carry out the information transmission. If the stored version information coincides with the own version information, the printer driver 220 skips displaying the information transmission confirmation screen 301. On the other hand, if the stored version information does not coincide with the own version information, the printer driver 220 displays the information transmission confirmation screen 301.

Next, Case 2 in which the printer driver 220 is installed without using the installer 201 will be described.

If a means such as AddPrinter described in the first exemplary embodiment is used, the OS 210 itself issues an install event, which causes the installation processing of the printer driver 220 to start. The OS 210 calls up the install event processing unit 221 within the printer driver 220 associated with the install event which the OS 210 has issued to process the install event. When the install event processing unit 221 completes the processing, the printer driver 220 is registered in the OS 210 and becomes available for use. Accordingly, in Case 2, since the install setting storage unit 202 of the installer 201 does not carry out any processing, the setting 1 is not stored in the storage region 630.

As in Case 1, the printer driver 220 refers to the setting 1 stored in the storage region 630, which allows the printer driver 220 to carry out the screen display control. However, although the printer driver 220 refers to the setting 1 in the storage region 630 at the timing of carrying out the information transmission, the setting 1 is not present in the storage region 630 as mentioned earlier, and thus printer driver 220 displays the information transmission confirmation screen 301.

Lastly, Case 3 in which Case 2 is performed in an environment where the printer driver 220 has been installed first in Case 1 will be described.

At the point when the printer driver 220 is installed in the first installation using the installer 201, the setting 1 is present in the storage region 630. If the printer driver 220 is to be installed without using the installer 201 in the aforementioned state, the setting 1 stored during the first installation remains as is in the storage region 630.

As in Case 1 and Case 2, the printer driver 220 refers to the setting 1 stored in the storage region 630 to carry out the screen display control. In the third exemplary embodiment, the printer driver 220 refers to the setting 1 in the storage region 630 at the timing of carrying out the information transmission. If the stored version information coincides with the own version information, the printer driver 220 skips displaying the information transmission confirmation screen 301. On the other hand, if the stored version information does not coincide with the own version information, the printer driver 220 displays the information transmission confirmation screen 301. This enables a control to allow the information transmission confirmation screen 301 to be displayed only when the printer driver 220 is installed to overwrite a different version thereof.

With the above-described configuration, as in the second exemplary embodiment, when the printer driver 220 is installed to overwrite the same version thereof, the screen display within the printer driver 220 can be controlled with the previous setting information being inherited. Further, with the above-described configuration, the installer 201 dynamically obtains the version information from the printer driver 220 carrying out the version management, and thus, advantageously, the troublesome version management among different applications does not need to be carried out.

In addition, an exemplary embodiment of the present invention can also be realized through the following processing.

That is, software (program) to realize the functions of the above-described exemplary embodiments is supplied to a system or an apparatus via a network or various storage media, and a computer (or CPU, MPU, and the like) in the system or in the apparatus loads the program to execute the program.

The screen display within the printer driver 220 can be controlled without mistakenly using information set by the installer 201.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-122912 filed May 30, 2012, which is hereby incorporated by reference herein in its entirety.

What is claimed is:

1. An information processing apparatus, comprising:
   a first storage unit configured to store first information indicating that a user has approved of processing by a first printer driver in a first storage region;
   a second storage unit configured to store second information to be used for determining whether or not a consent screen is to be displayed in a second storage region after the first information is stored by the first storage unit, the consent screen receiving an instruction from a user as to whether or not the user would approve of processing by a second printer driver;
   a deletion unit configured to delete the first information from the first storage region; and
   a control unit configured to determine whether or not to display the consent screen in accordance with the second information, when, after the first information has been deleted, a second printer driver is to be installed to overwrite the first printer driver without using an installer for the second printer driver;
   a determination unit configured to determine whether the first information or disapproval information indicating that a user has not approved of processing by the first printer driver is stored in the first storage region,
   wherein version information of the first printer driver is stored in the second storage information when the determination unit determines that the first information is stored, and the version information stored in the second storage region is deleted when the determination unit determines that the disapproval information is stored.

2. The information processing apparatus according to claim 1,
   wherein the second information is version information of the first printer driver,
   wherein the control unit is configured to determine not to display the consent screen when the second printer driver is installed without using the installer for the second printer driver, and a version of the second printer driver is the same as a version of the first printer driver, and to determine to display the consent screen when the second printer driver is installed without using the installer for the second printer driver, and a version of the second printer driver is different from a version of the first printer driver.

3. A control method, comprising:
   firstly storing first information indicating that a user has approved of processing by a first printer driver in a first storage region;
   secondly storing second information to be used for determining whether or not a consent screen is to be displayed in a second storage region after the first information is first stored, the consent screen receiving an instruction from a user as to whether or not the user would approve of processing by a second printer driver;
   deleting the first information from the first storage region; and
   performing control to determine whether or not to display the consent screen in accordance with the second information, when, after the first information has been deleted, a second printer driver is to be installed to overwrite the first printer driver without using an installer for the second printer driver;
   determining whether the first information or disapproval information indicating that a user has not approved of processing by the first printer driver is stored in the first storage region,
   wherein version information of the first printer driver is stored in the second storage information when the determining determines that the first information is stored, and the version information stored in the second storage region is deleted when the determining determines that the disapproval information is stored.

4. The control method according to claim 3,
   wherein the second information is version information of the first printer driver, and
   wherein the controlling determines not to display the consent screen when the second printer driver is installed without using the installer for the second printer driver, and a version of the second printer driver is the same as a version of the first printer driver, and displays the consent screen when the second printer driver is installed without using the installer for the second printer driver, and a version of the second printer driver is different from a version of the first printer driver.

5. A non-transitory computer-readable storage medium having a program recorded thereon, the program causes a computer to execute:
   firstly storing first information indicating that a user has approved of processing by a first printer driver in a first storage region;
   secondly storing second information to be used for determining whether or not a consent screen is to be displayed in a second storage region after the first information is first stored, the consent screen receiving an instruction from a user as to whether or not the user would approve of processing by a second printer driver;
   deleting the first information from the first storage region; and
   performing control to determine whether or not to display a the consent screen in accordance with the second information, when, after the first information has been deleted, a second printer driver is to be installed to overwrite the first printer driver without using an installer for the second printer driver;
   determining whether the first information or disapproval information indicating that a user has not approved of processing by the first printer driver is stored in the first storage region,
   wherein version information of the first printer driver is stored in the second storage information when the determining determines that the first information is stored, and the version information stored in the second storage region is deleted when the determining determines that the disapproval information is stored.

6. The non-transitory computer-readable storage medium according to claim 5,
   wherein the second information is version information of the first printer driver, and
   wherein the controlling determines not to display the consent screen when the second printer driver is installed without using the installer for the second printer driver, and a version of the second printer driver is the same as a version of the first printer driver, and displays the consent screen when the second printer driver is installed without using the installer for the second printer driver, and a version of the second printer driver is different from a version of the first printer driver.

* * * * *